(12) United States Patent
Gunda et al.

(10) Patent No.: US 12,124,477 B2
(45) Date of Patent: Oct. 22, 2024

(54) SCALABLE AND SYSTEM-AGNOSTIC REPLICATION MECHANISM BETWEEN ON-PREMISES AND CLOUD STORAGE SYSTEMS

(71) Applicant: Dell Products L.P., Round Rock, TX (US)

(72) Inventors: Kalyan C. Gunda, Bangalore (IN); Richard Chenyu Ding, Shanghai (CN); Zongque Xu, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/059,775

(22) Filed: Nov. 29, 2022

(65) Prior Publication Data

US 2024/0176799 A1  May 30, 2024

(51) Int. Cl.
*G06F 16/27* (2019.01)
*G06F 16/22* (2019.01)
*G06F 16/25* (2019.01)

(52) U.S. Cl.
CPC .......... *G06F 16/27* (2019.01); *G06F 16/2219* (2019.01); *G06F 16/258* (2019.01)

(58) Field of Classification Search
CPC ..... G06F 16/27; G06F 16/2219; G06F 16/258
See application file for complete search history.

(56) References Cited

U.S. PATENT DOCUMENTS

| | | | |
|---|---|---|---|
| 10,860,604 B1* | 12/2020 | Pandey | G06F 11/1402 |
| 2010/0333116 A1* | 12/2010 | Prahlad | G06F 3/061 |
| | | | 713/153 |
| 2019/0171650 A1* | 6/2019 | Botev | G06F 16/2358 |
| 2020/0057697 A1* | 2/2020 | Yeung | G06F 11/1466 |
| 2020/0348852 A1* | 11/2020 | Duggal | G06F 3/0604 |
| 2020/0364185 A1* | 11/2020 | Beier | G06F 16/178 |

* cited by examiner

*Primary Examiner* — Robert W Beausoliel, Jr.
*Assistant Examiner* — Mohammad S Bhuyan
(74) *Attorney, Agent, or Firm* — Amin, Turocy & Watson, LLP

(57) ABSTRACT

A system can register, by a replication component and with a notification component, for notifications to changes in a group of data in data storage, wherein the notification component is configured to write respective changes in the group of data to a replication stream. The system can retrieve, by the replication component, a change of the changes in the group of data from the replication stream. The system can, in response to determining that the change corresponds to a replication policy, replicate, by the replication component, data of the group of data that corresponds to the change to a target system, wherein the replication component is configured to perform a replication on target systems having respective different storage types.

20 Claims, 12 Drawing Sheets

400

(402)

↓

DETERMINING TO PERFORM A FIRST REPLICATION PRIOR TO PERFORMING A SECOND REPLICATION 404

↓

LISTING DATA IN A BUCKET INDEPENDENTLY OF WHETHER RESPECTIVE EVENTS HAVE OCCURRED FOR RESPECTIVE DATA OF THE GROUP OF DATA 406

↓

SENDING RESPECTIVE CREATION EVENTS FOR THE DATA TO THE REPLICATION STREAM 408

DETERMINING A CHANGE TYPE OF THE CHANGE, WHEREIN THE CHANGE TYPE COMPRISES A COPY OPERATION, AN UPDATE OPERATION, OR A DELETE OPERATION 604

REPLICATING THE DATA BASED ON THE CHANGE TYPE 606

IN RESPONSE TO DETERMINING THAT AN ERROR HAS OCCURRED THAT CAUSED EVENT ORDER MISPLACEMENT, COMPARING A FIRST LAST MODIFIED TIME IN THE CHANGE WITH A SECOND LAST MODIFIED TIME FOR THE DATA THAT IS STORED IN A DATA STORE TO PRODUCE A RESULT 804

IN RESPONSE TO DETERMINING THAT THE RESULT INDICATES THAT THE FIRST LAST MODIFIED TIME IS MORE RECENT THAN THE SECOND LAST MODIFIED TIME, DETERMINING TO PERFORM THE REPLICATING 806

SCALABLE AND SYSTEM-AGNOSTIC REPLICATION MECHANISM BETWEEN ON-PREMISES AND CLOUD STORAGE SYSTEMS

BACKGROUND

An object storage system can comprise storing data as objects in a flat address space. Object storage can be viewed in contrast with file storage, where data is stored as files in a hierarchy of directories. Replication can generally comprise backing data up from one storage system to another.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can register, by a replication component and with a notification component, for notifications to changes in a group of data in data storage, wherein the notification component is configured to write respective changes in the group of data to a replication stream. The system can retrieve, by the replication component, a change of the changes in the group of data from the replication stream. The system can, in response to determining that the change corresponds to a replication policy, replicate, by the replication component, data of the group of data that corresponds to the change to a target system, wherein the replication component is configured to perform a replication on target systems having respective different storage types.

An example method can comprise retrieving, by a system comprising a processor, a change in data of a group of data that are stored in storage from a replication queue. The method can further comprise, in response to determining that the change corresponds to a replication policy, replicating, by the system, the data that corresponds to the change to a target system. The method can further comprise performing, by the system, a replication on target systems having respective different storage types.

An example non-transitory computer-readable medium can comprise instructions that, in response to execution, cause a system comprising a processor to perform operations. These operations can comprise retrieving an event notification for data of a group of data s from a replication queue, wherein the group of data are stored in storage. These operations can further comprise, in response to determining that the event notification corresponds to a replication policy, replicating the data to a target system.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates another example process flow that can facilitate a bootstrap portion of a scalable and system-agnostic replication mechanism between on-premises and cloud storage systems, in accordance with an embodiment of this disclosure;

FIG. 6 illustrates another example process flow that can facilitate replication based on change type with a scalable and system-agnostic replication mechanism between on-premises and cloud storage systems, in accordance with an embodiment of this disclosure;

FIG. 8 illustrates another example process flow that can facilitate a positive case of error handling by last modified time with a scalable and system-agnostic replication mechanism between on-premises and cloud storage systems, in accordance with an embodiment of this disclosure;

DETAILED DESCRIPTION

Overview

Figure 1:
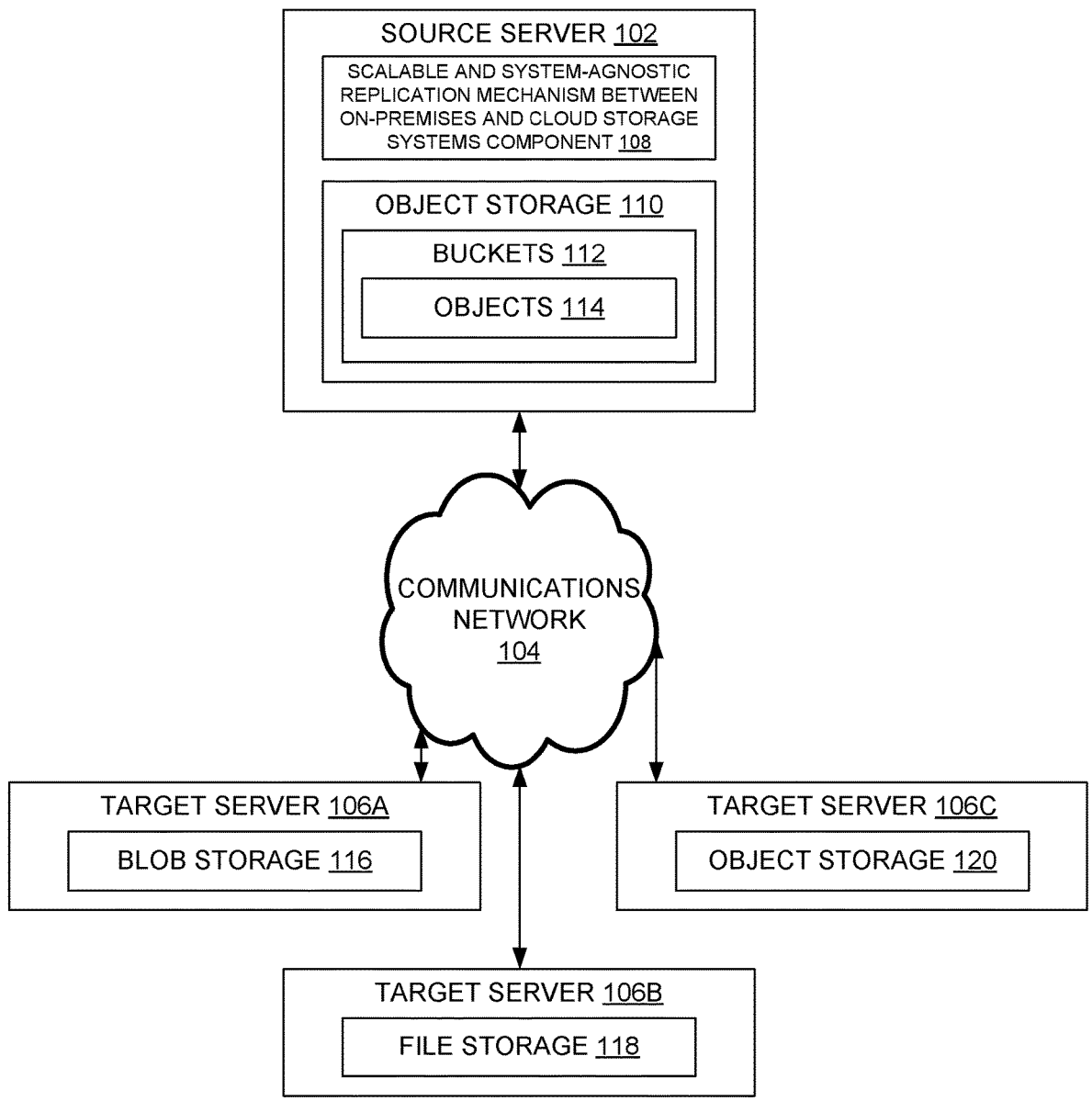
FIG. 1 illustrates an example system architecture that can facilitate a scalable and system-agnostic replication mechanism between on-premises and cloud storage systems, in accordance with an embodiment of this disclosure.

The examples herein generally relate to replication where source data is stored as data objects. It can be appreciated that the techniques can be applied to scenarios where the source data is stored differently, such as files in a hierarchical system of folders, or as data blocks.

Object storage systems have become increasingly important for companies to build their infrastructures. Replication (which can generally comprise copying data on additional storage locations for reasons such as data protection, data access speed, and/or separating analytics/test load from usage load)

Replication can be useful for any object storage system to enable various use cases, like disaster recovery, backup, test and development, and analytics in a remote data center and/or cloud. Prior approaches to object replication generally do not scale well, as the number of objects grows into millions and billions. Additionally, prior approaches to object replication can have a problem that a replication target must be an object storage system. The present techniques can provide for a scalable and system-agnostic replication mechanism that solves both of these problems with object replication.

It can be that object storage systems have become increasingly used for and by companies to build their infrastructures. Object storage systems can be configured to manage and manipulate data using objects as distinct units. In object storage systems, objects are generally organized in buckets that have a distinct set of configurations for management. Listing objects under one bucket can be a costly operation for object systems, especially when a total number of objects in a bucket runs into millions.

Some object storage systems can support event notification. Event notification can be configured per bucket. Event notification can comprise a feature to publish notifications when certain operations happen in a given bucket. Among various events, new object creations, object removals, and object attribute updates can be captured with notifications with this feature.

Object replication can be often requested for object storage systems. Use cases for replication can include separating data for storage and analytics, backup, and/or disaster recovery.

As hybrid cloud architectures (those that comprise combining computing resources stored on-premises (sometimes referred to as "on-prem") with remote, cloud-based computing resources), flexibility on replication behavior can be desired, with replication support from on-prem to off-prem, across clouds and/or between one on-prem vendor to another. Common features of replication can include replicating only object data and/or object metadata associated with the objects: and replicating a subset of objects based on some criteria. These customizable behaviors can be defined in replication policies. Replication policies can be attached to buckets to facilitate replication for objects under the bucket.

With multi-cloud systems (those that aggregate computing resources of multiple different cloud-based computing resources, including those of different vendors), replication uses cases between storage systems can become more generalized. For example, it can be that a replication target for an object storage system is not always another object storage system. That is, blob storage, file storage, or a public cloud could be involved as well.

Prior approaches for replication in an object storage system have been based on a subsystem on a source site. This subsystem can comprise a replication processing component and an object copying library.

A replication subsystem can process replications in a batched manner. Based on a configured replication policy, a replication service can list objects to find a list of objects changed during a specified time interval, then submit the change list to an object copying library based on a predefined schedule.

According to prior approaches, a replication subsystem can determine whether an object is changed or not by comparing the object's last modified time. When a batch runs for the first-time, a replication service considers all objects to be included in the change list. When a batch is completed, the replication service can set the latest modified time for the batch as a current time. For subsequent batches, the replication service can determine whether an object is changed by comparing a last modified time on the object and the time modified time saved from the last batch.

According to prior approaches, a replication subsystem can execute the copy to a target site, then update the batch outcome according to a copy result. When a replication error occurs, a failure status can be saved on object internal metadata and replication can be retried in a next batch.

A problem with these prior approaches can relate to the approaches depending on listing objects, which might not scale well as a total number of objects in a bucket grows (e.g., into millions or billions of objects). An amount of time required to list objects to find changes since a last replication can be directly proportional to a total number of objects in a bucket. As a total number of objects in the bucket grows, the time taken to find changes grows, and it may not be scalable. This can result in an overall replication missing a recovery point objective (RPO, which can identify an amount of data that is allowed to be lost from lack of a replication occurring) as a total number of objects in a bucket grows.

Another problem with these prior approaches can relate to requiring a tight coupling of source and target systems, such as a replication progress and outcome is stored and linked to a source object, and by coordination with the target system via a proprietary protocol. It can be that the source system needs to understand semantics and return results from the target system, and an additional implementation can be required if the target system type is heterogenous (e.g., if it is either object storage or blob storage).

Another problem with these prior approaches can be that they require processing to be carried out in a batch manner. It can be that this approach is not suitable for scenarios where replication delay control is important.

The present techniques can be implemented to provide a scalable and system-agnostic replication mechanism that is designed for object storage systems. According to the present techniques, object notification can be used to track changes and establish a change set for replication. Replication processing can be notification-based, and decoupled from a main system so that coupling between a source system and a target system is avoided.

When a replication subsystem uses a prior technique for tracking object changes, it can be that the subsystem must understand the semantics of object internal metadata (e.g., the subsystem can need to know an interpretation of a delete marker to track deletes). When an object notification is used according to the present techniques, it can be that what the replication subsystem receives from the replication stream is an indication that the object operation (e.g., create, modify, or delete) happened, so it can be that there is no need to understand source system internals to track changes.

According to the present techniques, a replication subsystem can handle replications. The replication subsystem can comprise an event message queue, and a replication handler as the message queue consumer.

To facilitate replication for a bucket, object notification can be enabled beforehand to issue notifications regarding object creations, deletions, and metadata updates into a replication subsystem event message queue.

When a replication policy is added on an existing bucket, a bootstrap process can be carried out to instantiate replication for existing objects. The bootstrap process can list objects in bucket and send object creation event to a replication subsystem event message queue.

Replication policy evaluation can be carried out at a replication handler. When the replication handler receives events belonging to an object that matches no replication policy, the replication handler can directly discard the event. When a replication handler receives events belonging to an object that matches a replication policy, the replication handler can execute a copy/update/delete operation on the target based on the event type.

The replication result can be saved by the replication handler in a separate database from the source system. The result can store a record of the last modified time of the replicated object.

In pathological cases (e.g., read failures and/or bugs) of event order misplacement, the replication handler can handle this scenario by comparing a last modified time in a notification event and a last modified time stored in a replication result. Stale notifications can be directly discarded.

Implementing the present techniques can provide the following advantages. One advantage can be that a replication processing does not rely on listing objects which, which can be a challenge to scale. Object changes (e.g., an object creation, deletion, or update) can be fully traced by event notifications. This model can allow a system to scale even as a number of objects increase to millions or billions per bucket.

Another advantage can be that the present techniques decouple a replication source system from a replication target system. It can be that the source system does not need any knowledge of the target system when the source system is set up for replication. This approach can extend replication to heterogenous target systems more easily, as compared with prior approaches, and can address scenarios that incorporate multi-clouds.

Another advantage can be that the present techniques are designed with streaming processing, which can facilitate replication use cases with high time constraints, such as where a replication must be completed within a delay. In terms of resource control, the present techniques can also be turned to simulate batch processing, as well (for example, by detaching a replication handler, and reattaching based on a time schedule).

The present techniques can provide a system-agnostic replication mechanism that facilitates replication from an object storage system to a variety of on-prem systems, and/or public cloud storage systems.

The present techniques can provide a scalable replication mechanism that does not depend on a total number of objects in a bucket, by using event notifications to track object changes. This can lead to a highly-scalable replication system.

The present techniques can use streaming processing to decouple replication source and target systems, rending an overall solution agnostic as to a target system type.

Example Architectures

FIG. 1 illustrates an example system architecture 100 that can facilitate a scalable and system-agnostic replication mechanism between on-premises and cloud storage systems, in accordance with an embodiment of this disclosure.

System architecture 100 comprises source server 102, communications network 104, target server 106A, target server 106B, and target server 106C. In turn, source server 102 comprises scalable and system-agnostic replication mechanism between on-premises and cloud storage systems component 108, and object storage 110 (which comprises buckets 112 and objects 114). Target server 106A comprises blob storage 116, target server 106B comprises file storage 118, and target server 106C comprises object storage 110.

Figure 12:
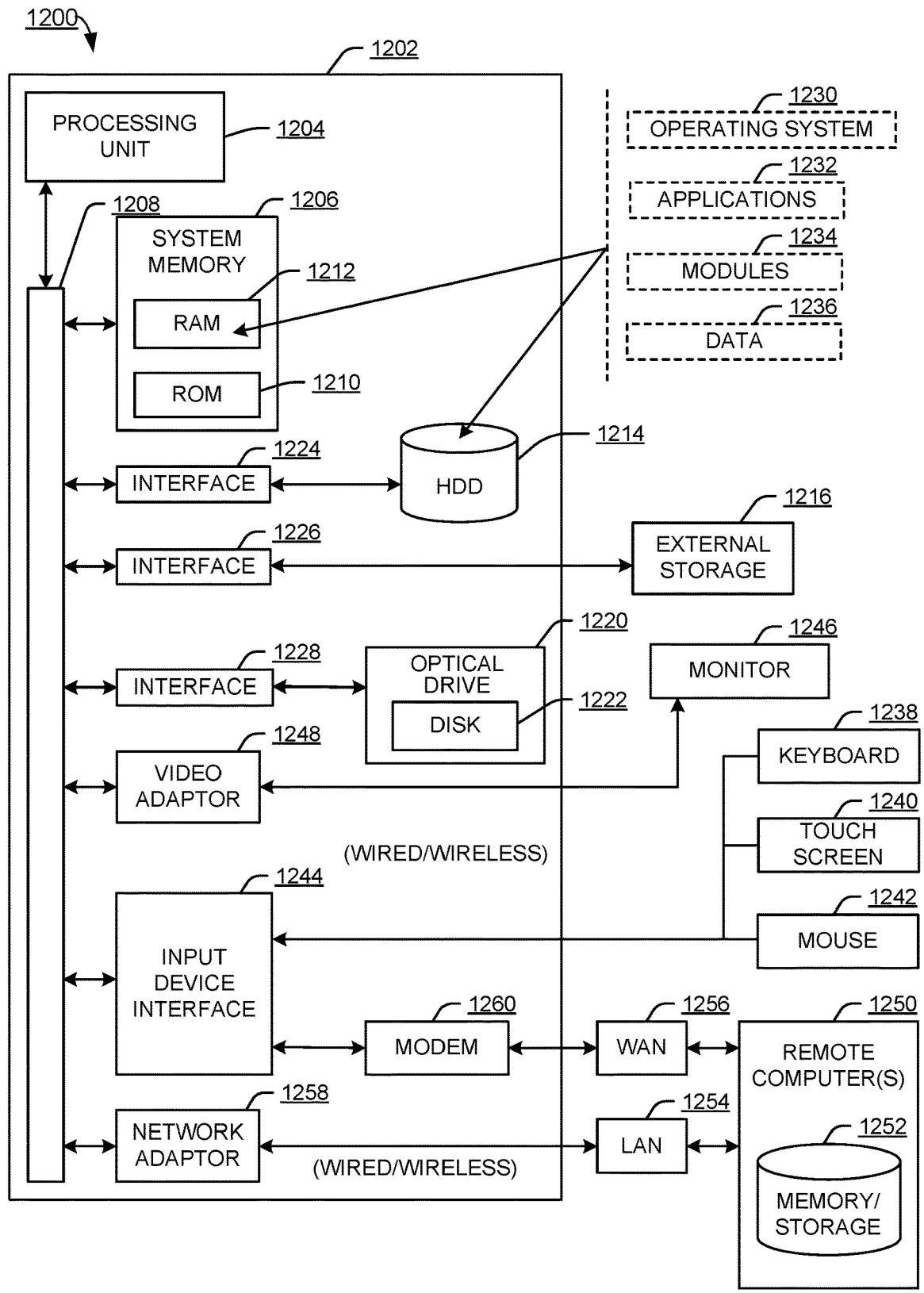
FIG. 12 illustrates an example block diagram of a computer operable to execute an embodiment of this disclosure.

Each of source server 102, target server 106A, target server 106B, and/or target server 106C can be implemented with part(s) of computing environment 1200 of FIG. 12. Communications network 104 can comprise a computer communications network, such as the Internet.

Scalable and system-agnostic replication mechanism between on-premises and cloud storage systems component 108 can facilitate replications from object storage 110 to one or more of target server 106A, target server 106B, and target server 106C. Scalable and system-agnostic replication mechanism between on-premises and cloud storage systems component 108 can facilitate replications from object storage 110 can register for notifications of events of objects (of objects 114) in certain buckets (of buckets 112) of object storage 110. In object storage, 110, objects 114 can generally be stored in buckets 112, where a bucket is a flat address space (in contrast to a file hierarchy in file storage).

When scalable and system-agnostic replication mechanism between on-premises and cloud storage systems component 108 receives an event notification, it can determine if the corresponding object is identified as part of a replication policy. Where the object is identified as part of a replication policy, then scalable and system-agnostic replication mechanism between on-premises and cloud storage systems component 108 can replicate the object to the appropriate target server. In this manner of processing events, scalable and system-agnostic replication mechanism between on-premises and cloud storage systems component 108 can be scalable because it does not rely on listing all objects in a bucket, so performance does not degrade as the number of objects in a bucket increases (leading to a more resource-heavy operation of listing objects in that bucket).

Target server 106A comprises blob storage 116, which can be a type of storage where data is stored as a single binary item. Target server 106B comprises file storage 118, which can be a type of storage where data is stored as files in a hierarchy of directories. Target server 106C comprises object storage 110, which can be similar to object storage 110. These three types of storage are different, or heterogenous.

Scalable and system-agnostic replication mechanism between on-premises and cloud storage systems component 108 can be configured to replicate objects to any of target server 106A, target server 106B, and target server 106C. Thus, scalable and system-agnostic replication mechanism between on-premises and cloud storage systems component 108 can be considered to be agnostic as to a type of storage on a target server.

Client computer 106 can transmit data to source server 102 via communications network 104.

In some examples, scalable and system-agnostic replication mechanism between on-premises and cloud storage systems component 108 can implement part(s) of the process flows of FIGS. 3-10 to implement a scalable and system-agnostic replication mechanism between on-premises and cloud storage systems.

It can be appreciated that system architecture 100 is one example system architecture for a scalable and system-agnostic replication mechanism between on-premises and cloud storage systems, and that there can be other system architectures that facilitate a scalable and system-agnostic replication mechanism between on-premises and cloud storage systems.

Figure 2:
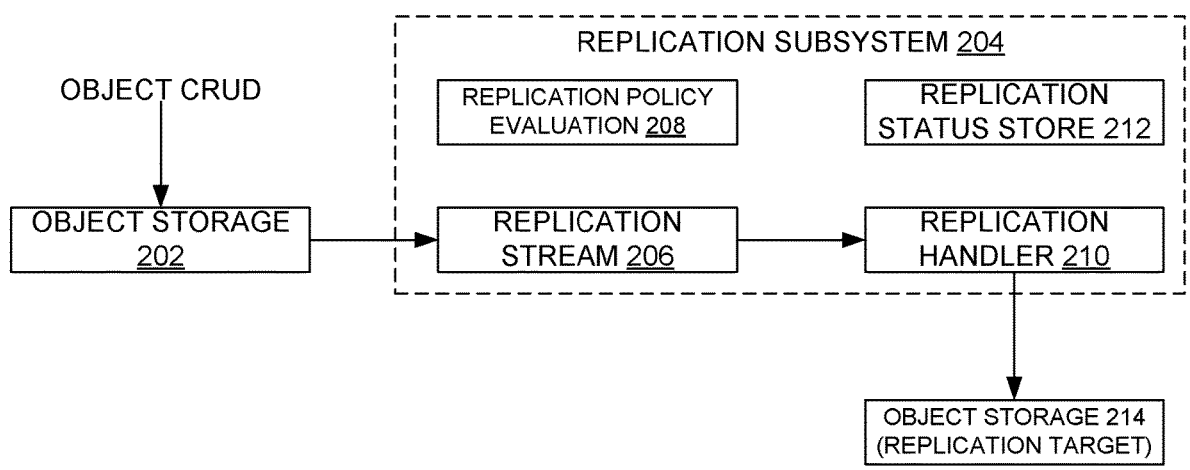
FIG. 2 illustrates another example system architecture that can facilitate a scalable and system-agnostic replication mechanism between on-premises and cloud storage systems, in accordance with an embodiment of this disclosure.

FIG. 2 illustrates another example system architecture 200 that can facilitate a scalable and system-agnostic replication mechanism between on-premises and cloud storage systems, in accordance with an embodiment of this disclosure. In some examples, part(s) of system architecture 200 can be used to implement part(s) of system architecture 100 of FIG. 1.

System architecture 200 comprises object storage 202, replication subsystem 204, replication stream 206, replication policy evaluation 208, replication handler 210, replication status store 212, and object storage 214.

Object storage 202 can be similar to object storage 110 of FIG. 1. Replication subsystem 204 can be similar to scalable and system-agnostic replication mechanism between on-premises and cloud storage systems component 108 of FIG. 1. Object storage 214 can be similar to object storage 120 of FIG. 1 and function as a replication target (and it can be appreciated that other types of target storage can be used as a replication target, such as in the example of FIG. 1).

Replication subsystem 204 comprises replication stream 206 (which can comprise a queue of object events about object storage 202): replication policy evaluation 208 (which can identify one or more replication policies): replication handler 210 (which can process object events from replication stream 206, and where the corresponding object is identified by a replication policy of replication policy evaluation 208, perform a corresponding replication); and replication status store (in which replication handler 210 can store respective timestamps of a most recent time that it replicated particular objects, and this information can be used in case of a system error).

In some examples a create, read, update, or delete (CRUD) operation is performed on an object in object storage 202. A notification identifying this CRUD operation (or event) can be sent to replication stream 206. Replication handler 210 can receive this notification from replication stream 206, process it in view of replication policy evaluation 208, and perform a replication to object storage 214 where appropriate. Replication handler can also log a timestamp of when a replication of particular objects was most recently performed in replication status store 212.

Example Process Flows

Figure 3:
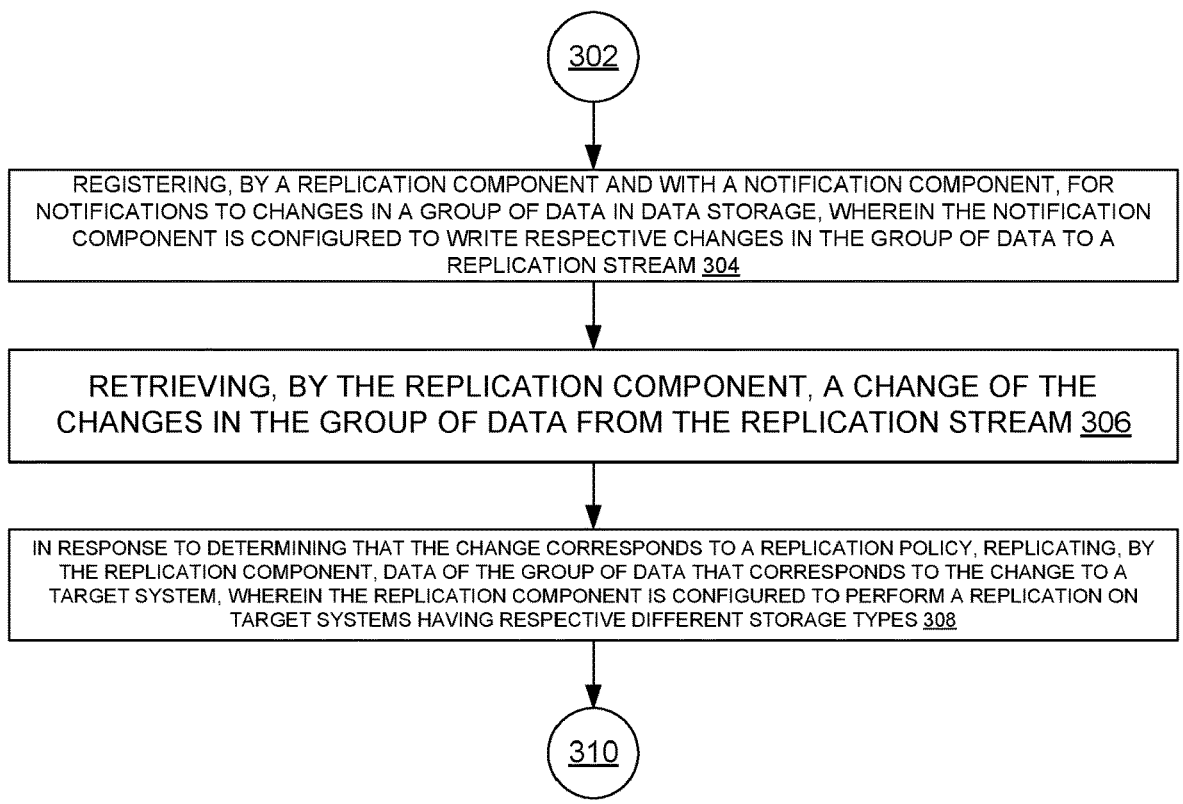
FIG. 3 illustrates an example process flow that can facilitate a scalable and system-agnostic replication mechanism between on-premises and cloud storage systems, in accordance with an embodiment of this disclosure.

FIG. 3 illustrates an example process flow 300 that can facilitate a scalable and system-agnostic replication mechanism between on-premises and cloud storage systems, in accordance with an embodiment of this disclosure. In some examples, one or more embodiments of process flow 300 can be implemented by scalable and system-agnostic replication mechanism between on-premises and cloud storage systems component 108 of FIG. 1, or computing environment 1200 of FIG. 12.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 300 begins with 302, and moves to operation 304. Operation 304 depicts registering, by a replication component and with a notification component, for notifications to changes in a group of data in data storage, wherein the notification component is configured to write respective changes in the group of data to a replication stream. That is, a replication handler (e.g., replication handler 210 of FIG. 2) can register for events on a bucket that can contain a group of data objects, and an event handler of object storage 202 can write events to a replication stream (e.g., replication stream 206).

After operation 304, process flow 300 moves to operation 306.

Operation 306 depicts retrieving, by the replication component, a change of the changes in the group of data from the replication stream. Continuing with the example of FIG. 2, this can comprise replication handler 210 retrieving one event notification out of replication stream 206.

After operation 306, process flow 300 moves to operation 308.

Operation 308 depicts in response to determining that the change corresponds to a replication policy, replicating, by the replication component, data of the group of data that corresponds to the change to a target system, wherein the replication component is configured to perform a replication on target systems having respective different storage types. Continuing with the example of FIG. 2, this can comprise replication handler 210 determining that the event retrieved in operation 306 matches a replication policy (e.g., through replication policy evaluation 208), so replication handler 210 replicates the object, and replication handler 210 is agnostic as to a storage type of the target system.

In some examples, respective different storage types, of the different storage types of the target systems with which the replication component is configured to perform replications, comprise an object storage type, a file storage type, a blob storage type, and a public cloud storage type. That is, in some examples, a replication target can comprise an on-prem or a cloud system. And within that on-prem or cloud system, the target can store data as objects, files, or blobs.

In some examples, operation 308 comprises storing, by the replication component, a result of the replicating of the data in a data store. In some examples, the data store is stored separately from a source system that stores the data. In some examples, the storing of the result comprises storing a last modified time of the data in the data store.

That is, a replication result can be saved by the replication handler in a separate database from the source system. This result can record a last modified time of the replicated object.

In some examples, the results can be stored in persistent storage, which can comprise persistent memory (PMEM) or nonvolatile random access memory (NVRAM).

After operation 308, process flow 300 moves to 310, where process flow 300 ends.

FIG. 4 illustrates an example process flow 400 that can facilitate a bootstrap portion of a scalable and system-agnostic replication mechanism between on-premises and cloud storage systems, in accordance with an embodiment of this disclosure. In some examples, one or more embodiments of process flow 400 can be implemented by scalable and system-agnostic replication mechanism between on-premises and cloud storage systems component 108 of FIG. 1, or computing environment 1200 of FIG. 12.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 300 of FIG. 3, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 400 begins with 402, and moves to operation 404. Operation 404 depicts determining to perform a first replication prior to performing a second replication. That is, the second replication can be a replication from FIG. 3, where it is performed on a bucket (or other data storage structure, such as a folder in a file storage system) for which an initial replication has already been performed. In operation 404, the first replication can be the initial replication.

In some examples, operation 404 comprises performing the determining to perform the first replication in response to determining that the replication policy has been added to the data. That is, the first replication can be performed when encountering a new or modified replication policy that now covers the bucket.

After operation 404, process flow 400 moves to operation 406.

Operation 406 depicts listing data in a bucket independently of whether respective events have occurred for respective data of the group of data. That is, an initial replication can comprise listing all objects in a bucket to identify eligible objects for replication.

After operation 406, process flow 400 moves to operation 408.

Operation 408 depicts sending respective creation events for the data to the replication stream. That is, for each data (e.g., object) listed in operation 406, a creation event can be generated for that data, even though the data is not newly created. This data creation event can be processed by a replication handler that processes events to determine to replicate the data to a target system.

After operation 408, process flow 400 moves to 410, where process flow 400 ends.

Process flow 400 can be implemented to facilitate a bootstrap process, where this bootstrap process can list objects in a bucket, and send corresponding object creation events to a replication subsystem event message queue.

Figure 5:
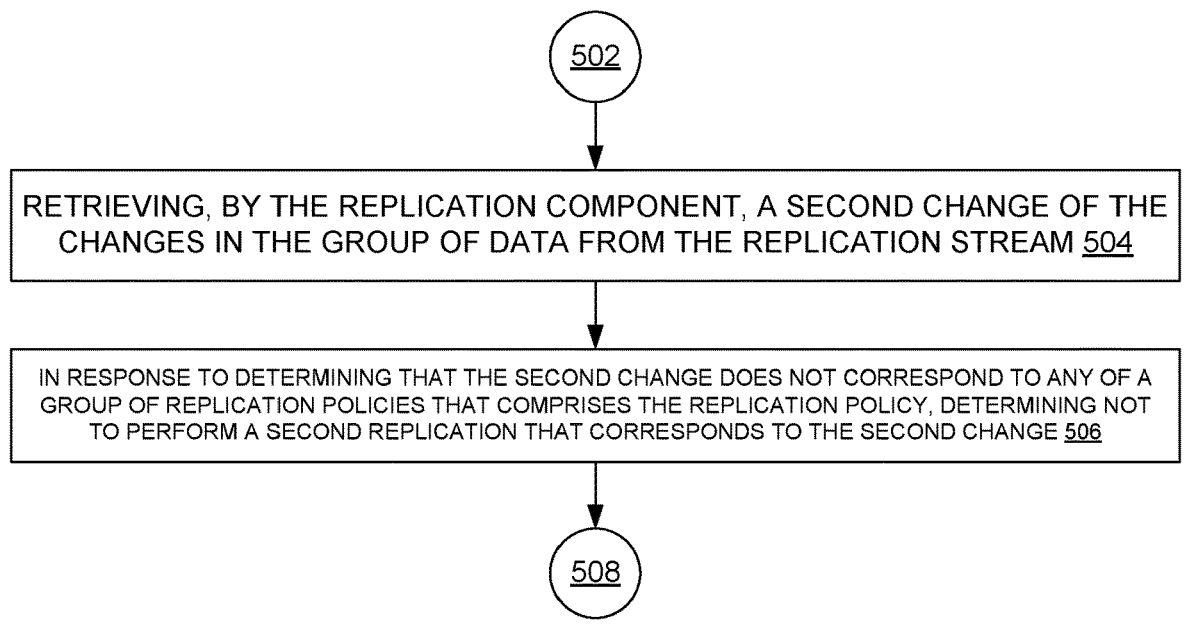
FIG. 5 illustrates another example process flow that can facilitate an attribute update portion of a scalable and system-agnostic replication mechanism between on-premises and cloud storage systems, in accordance with an embodiment of this disclosure.

FIG. 5 illustrates an example process flow 500 that can facilitate an attribute update portion of a scalable and system-agnostic replication mechanism between on-premises and cloud storage systems, in accordance with an embodiment of this disclosure. In some examples, one or more embodiments of process flow 500 can be implemented by scalable and system-agnostic replication mechanism between on-premises and cloud storage systems component 108 of FIG. 1, or computing environment 1200 of FIG. 12.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 300 of FIG. 3, process flow 400 of FIG. 4, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 500 begins with 502, and moves to operation 504. Operation 504 depicts retrieving, by the replication component, a second change of the changes in the group of data from the replication stream. In some examples, operation 504 can be implemented in a similar manner as operation 306 of FIG. 3, for a different change in the change stream.

After operation 504, process flow 500 moves to operation 506.

Operation 506 depicts, in response to determining that the second change does not correspond to any of a group of replication policies that comprises the replication policy, determining not to perform a second replication that corresponds to the second change. That is, when a replication handler encounters an event that belongs to an object that does not match a replication policy, the replication handler can discard the request.

After operation 506, process flow 500 moves to 508, where process flow 500 ends.

FIG. 6 illustrates an example process flow 500 that can facilitate replication based on change type with a scalable and system-agnostic replication mechanism between on-premises and cloud storage systems, in accordance with an embodiment of this disclosure. In some examples, one or more embodiments of process flow 600 can be implemented by scalable and system-agnostic replication mechanism between on-premises and cloud storage systems component 108 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 300 of FIG. 3, process flow 400 of FIG. 4, process flow 500 of FIG. 5, process flow 700 of FIG. 7, process flow 800 of FIG. 8, process flow 900 of FIG. 9, process flow 1000 of FIG. 10, and/or process flow 1100 of FIG. 11.

Process flow 600 begins with 602, and moves to operation 604. Operation 604 depicts determining a change type of the change, wherein the change type comprises a copy operation, an update operation, or a delete operation. This can be the change identified in operation 306 of FIG. 3.

After operation 604, process flow 600 moves to operation 606.

Operation 606 depicts replicating the data based on the change type. That is, when a replication handler receives events belonging to an object that matches a replication policy, the replication handler can execute a copy, update, or delete operation on the target based on the event type.

After operation 606, process flow 600 moves to 608, where process flow 600 ends.

Figure 7:
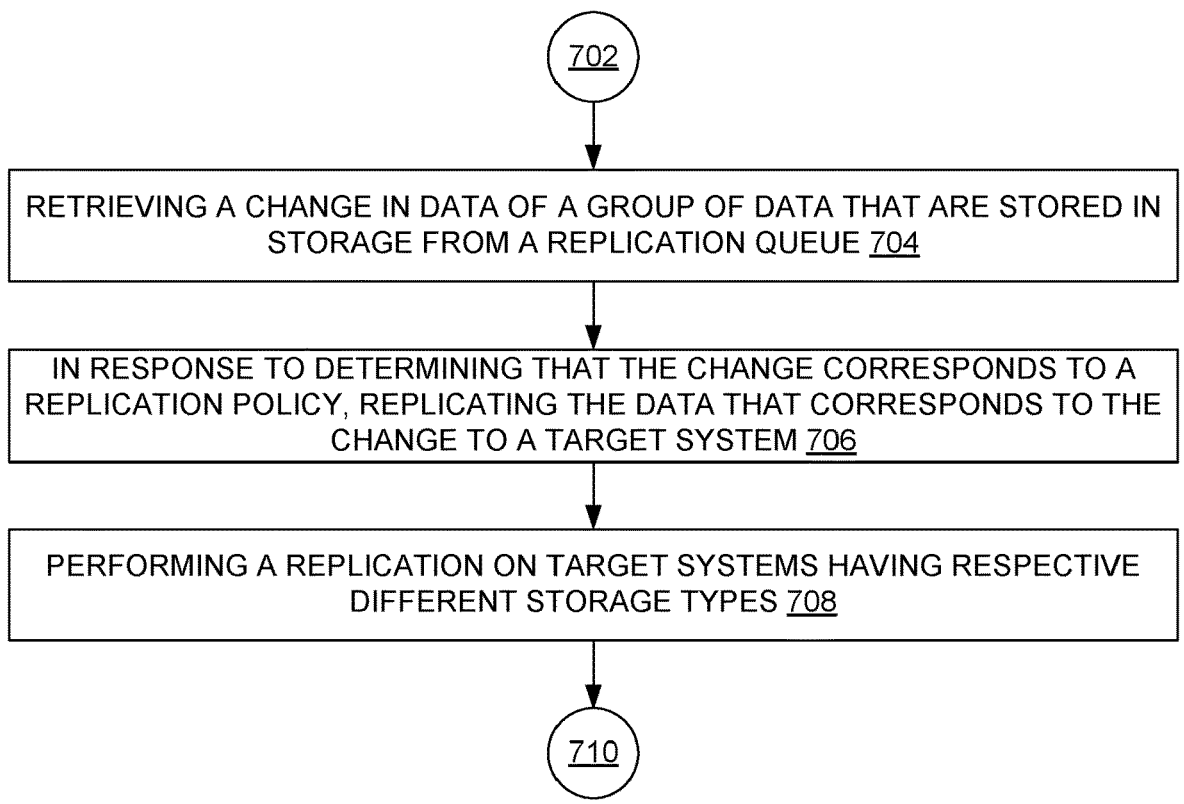
FIG. 7 illustrates another example process flow that can facilitate target-agnostic replication with a scalable and system-agnostic replication mechanism between on-premises and cloud storage systems, in accordance with an embodiment of this disclosure.

FIG. 7 illustrates an example process flow 700 that can facilitate target-agnostic replication with a scalable and system-agnostic replication mechanism between on-premises and cloud storage systems, in accordance with an embodiment of this disclosure. In some examples, one or more embodiments of process flow 700 can be implemented by scalable and system-agnostic replication mechanism between on-premises and cloud storage systems component 108 of FIG. 1, or computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 300 of FIG. 3, process flow 400 of FIG. 4, process flow 500 of FIG. 5, process flow 600 of FIG. 6, process flow 800 of FIG. 8, process flow 900 of FIG. 9, process flow 1000 of FIG. 10, and/or process flow 1100 of FIG. 11.

Process flow 700 begins with 702, and moves to operation 704. Operation 704 depicts retrieving a change in data of a group of data that are stored in storage from a replication queue. In some examples, operation 704 can be implemented in a similar manner as operation 306 of FIG. 3.

In some examples, the change indicates a creation, a deletion, or a metadata update. That is, to facilitate replication, an object notification can be enabled to notify object creations, deletions, and metadata updates into a replication subsystem event message queue.

After operation 704, process flow 700 moves to operation 706.

Operation 706 depicts, in response to determining that the change corresponds to a replication policy, replicating the data that corresponds to the change to a target system. In some examples, operation 706 can be implemented in a similar manner as operation 308 of FIG. 3.

After operation 706, process flow 700 moves to operation 708.

Operation 708 depicts performing a replication on target systems having respective different storage types. In some examples, operation 708 can be implemented in a similar manner as operation 308 of FIG. 3, where multiple replications are performed (which can correspond to multiple different replication policies) and the subject target systems can be of different types (e.g., on-prem or cloud, and file, blob, or object storage).

After operation 708, process flow 700 moves to 710, where process flow 700 ends.

FIG. 8 illustrates an example process flow 800 that can facilitate a positive case of error handling by last modified time with a scalable and system-agnostic replication mechanism between on-premises and cloud storage systems, in accordance with an embodiment of this disclosure. In some examples, one or more embodiments of process flow 800 can be implemented by scalable and system-agnostic replication mechanism between on-premises and cloud storage systems component 108 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 900 of FIG. 9, process flow 1000 of FIG. 10, and/or process flow 1100 of FIG. 11.

Process flow 800 begins with 802, and moves to operation 804. Operation 804 depicts, in response to determining that an error has occurred that caused event order misplacement, comparing a first last modified time in the change with a second last modified time for the data that is stored in a data store to produce a result. That is, pathological cases (e.g., read failures or bugs) can be processed to address event order misplacement.

After operation 804, process flow 800 moves to operation 806.

Operation 806 depicts, in response to determining that the result indicates that the first last modified time is more recent than the second last modified time, determining to perform the replicating. That is, a replication handler can address a pathological case by comparing a last modified time in a notification event and a last modified time stored in a replication result. Stale notifications can be discarded. Here, since the first last modified time is more recent than the second last modified time, the result can be determined not to be stale, and a corresponding replication can be performed.

After operation 806, process flow 800 moves to 808, where process flow 800 ends.

Figure 9:
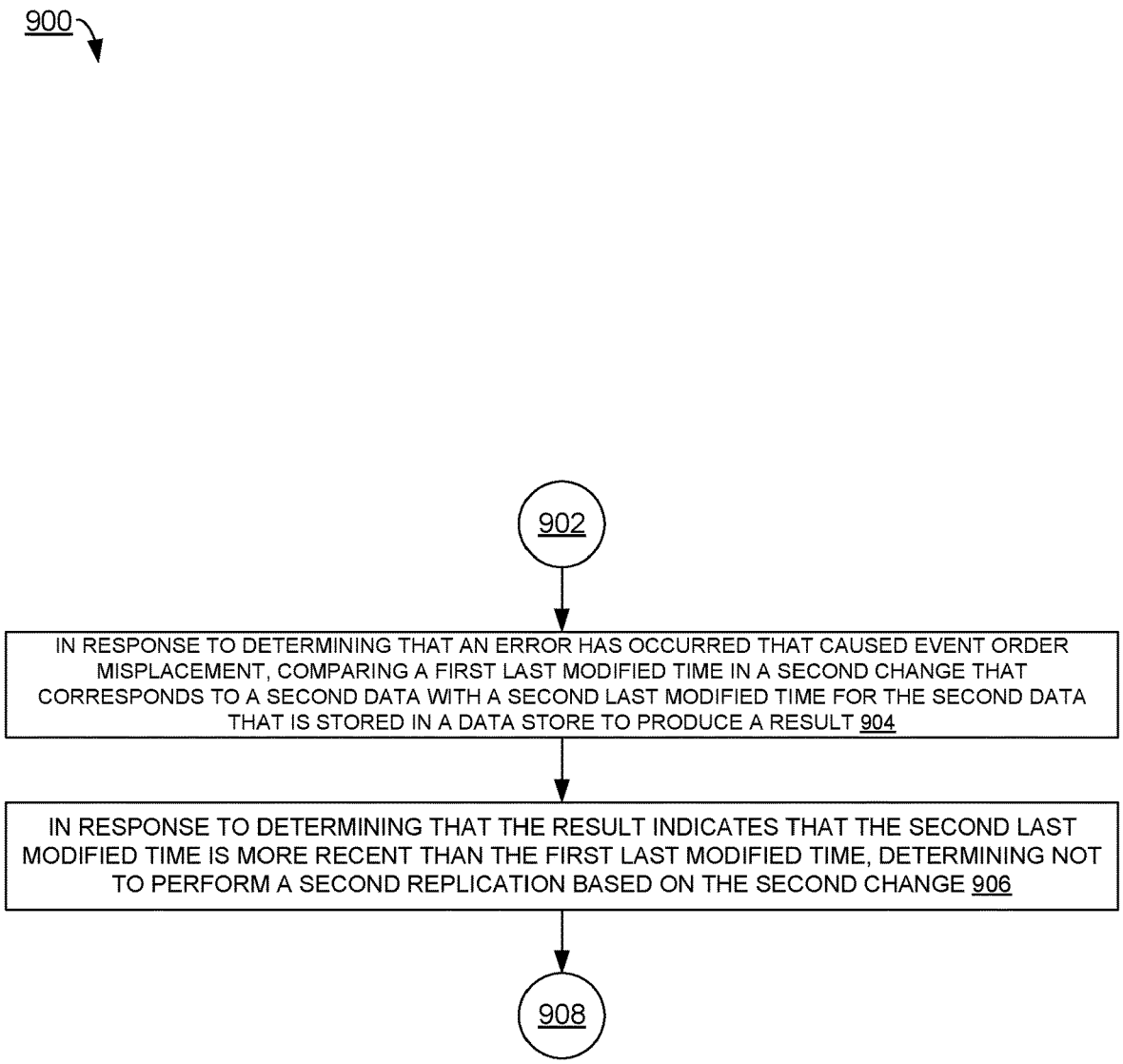
FIG. 9 illustrates another example process flow that can facilitate a negative case of error handling by last modified time with a scalable and system-agnostic replication mechanism between on-premises and cloud storage systems, in accordance with an embodiment of this disclosure.

FIG. 9 illustrates an example process flow 900 that can facilitate a negative case of error handling by last modified time with a scalable and system-agnostic replication mechanism between on-premises and cloud storage systems, in accordance with an embodiment of this disclosure. In some examples, one or more embodiments of process flow 900 can be implemented by scalable and system-agnostic replication mechanism between on-premises and cloud storage systems component 108 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 1000 of FIG. 10, and/or process flow 1100 of FIG. 11.

Process flow 900 begins with 902, and moves to operation 904. Operation 904 depicts, in response to determining that an error has occurred that caused event order misplacement, comparing a first last modified time in a second change that corresponds to a second data with a second last modified time for the second data that is stored in a data store to produce a result. In some examples, operation 904 can be implemented in a similar manner as operation 804 of FIG. 8.

After operation 904, process flow 900 moves to operation 906.

Operation 906 depicts, in response to determining that the result indicates that the second last modified time is more recent than the first last modified time, determining not to perform a second replication based on the second change. That is, a replication handler can address a pathological case by comparing a last modified time in a notification event and a last modified time stored in a replication result. Stale notifications can be discarded. Here, since the second last modified time is more recent than the first last modified time, the result can be determined to be stale, and it can be that a corresponding replication is not performed.

After operation 906, process flow 900 moves to operation 908, where process flow 900 ends.

Figure 10:
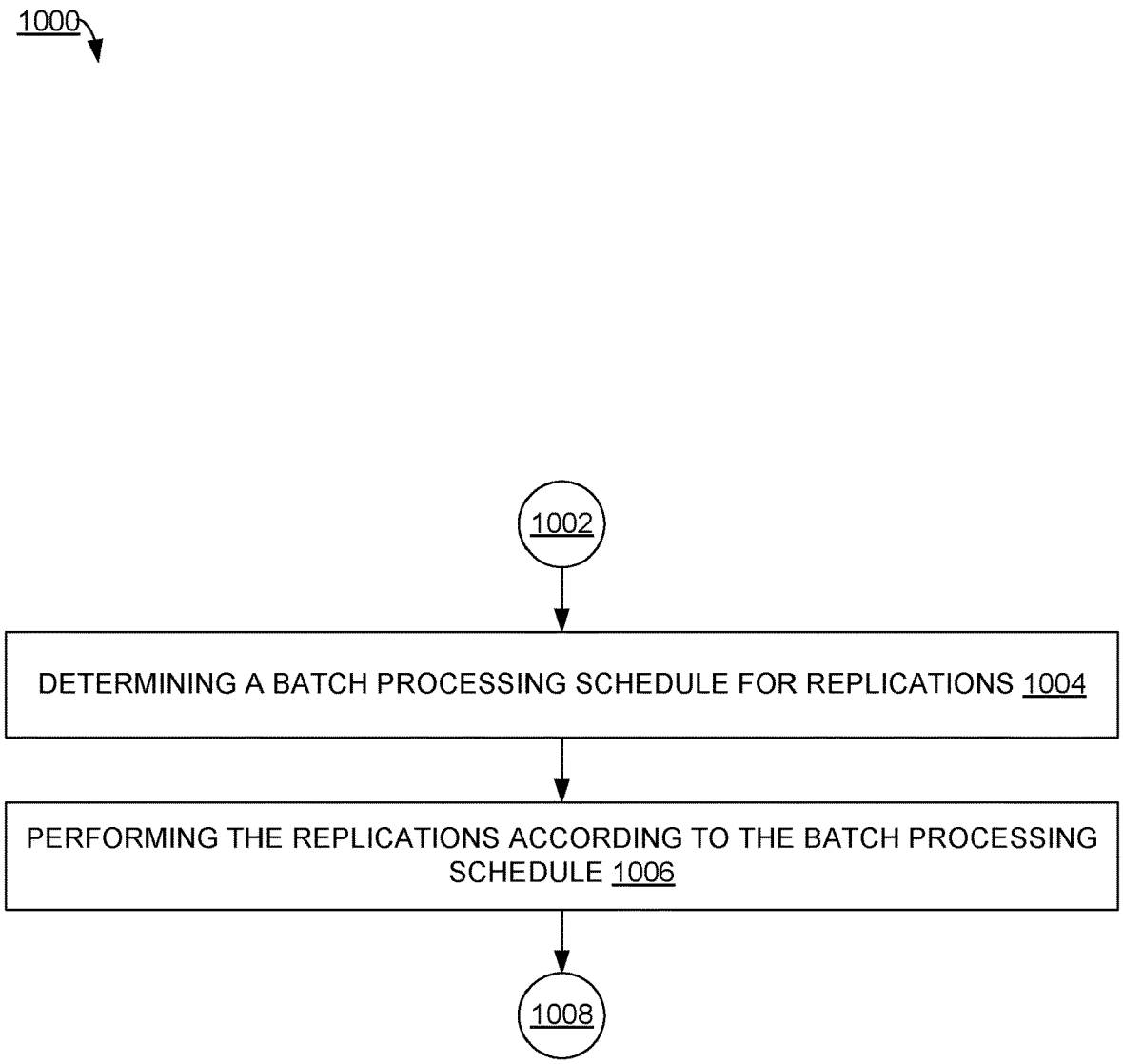
FIG. 10 illustrates another example process flow that can facilitate batch replication with a scalable and system-agnostic replication mechanism between on-premises and cloud storage systems, in accordance with an embodiment of this disclosure.

FIG. 10 illustrates an example process flow 1000 that can facilitate batch replication with a scalable and system-agnostic replication mechanism between on-premises and cloud storage systems, in accordance with an embodiment of this disclosure. In some examples, one or more embodiments of process flow 1000 can be implemented by scalable and system-agnostic replication mechanism between on-premises and cloud storage systems component 108 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1100 of FIG. 11.

Process flow 1000 begins with 1002, and moves to operation 1004. Operation 1004 depicts determining a batch processing schedule for replications. That is, it can be that replications are determined to be performed as part of batch processing, and a schedule is specified for when batch processing is performed.

After operation 1004, process flow 1000 moves to operation 1006.

Operation 1006 depicts performing the replications according to the batch processing schedule. That is, replications can be governed by this batch processing schedule of operation 1004, and performed when the schedule specifies that replications are permitted.

In some examples, the replicating is performed by a replication handler, and operation 1004 comprises detaching the replication handler from the replication queue in response to determining that the batch processing schedule indicates that replications are not to be performed at a current time, and attaching the replication handler to the replication queue in response to determining that the batch processing schedule indicates that replications are to be performed at the current time.

That is, batch processing can be simulated on an event-based replication system by detaching and reattaching the replication handler from the event queue based on the schedule.

After operation 1006, process flow 1000 moves to 1008, where process flow 1000 ends.

Figure 11:
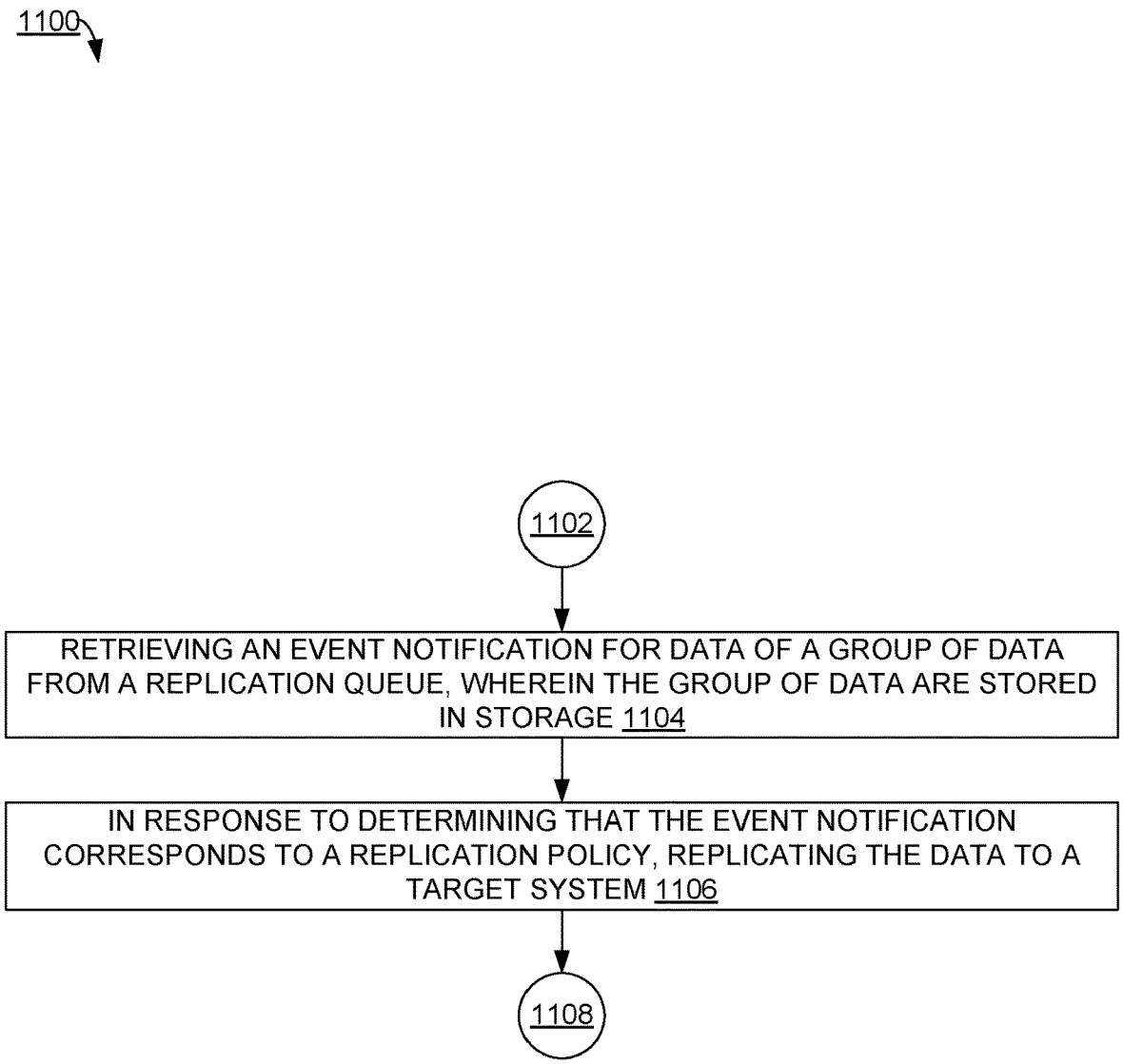
FIG. 11 illustrates an example process flow 1100 that can facilitate processing an event notification in a scalable and system-agnostic replication mechanism between on-premises and cloud storage systems, in accordance with an embodiment of this disclosure.

FIG. 11 illustrates an example process flow 1100 that can facilitate processing an event notification in a scalable and system-agnostic replication mechanism between on-premises and cloud storage systems, in accordance with an embodiment of this disclosure. In some examples, one or more embodiments of process flow 1100 can be implemented by scalable and system-agnostic replication mechanism between on-premises and cloud storage systems component 108 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 1100 begins with 1102, and moves to operation 1104. Operation 1104 depicts retrieving an event notification for data of a group of data from a replication queue, wherein the group of data are stored in storage. In some examples, operation 1104 can be implemented in a similar manner as operation 306 of FIG. 3.

In some examples, operation 1104 comprises, before the replicating, listing data in a bucket independently of whether respective events have occurred for respective data of the group of data, and sending respective creation events for the data to the replication queue. That is, bootstrapping can be performed with an initial replication, according to the present techniques.

In some examples, operation 1104 can be performed by a system. In some examples, the system is a message queue consumer of the replication queue. That is, a replication subsystem can comprise an event message queue, and a replication handler as a message queue consumer.

After operation 1104, process flow 1100 moves to operation 1106.

Operation 1106 depicts, in response to determining that the event notification corresponds to a replication policy, replicating the data to a target system. In some examples, operation 1106 can be implemented in a similar manner as operation 308 of FIG. 3.

In some examples, operation 1106 comprises performing a replication on target systems having respective different storage types. That is, replications according to the present techniques can function with heterogenous target systems.

In some examples, the replicating of the data is performed by a replication handler that performs streaming processing. That is, streaming processing can be implemented to decouple a replication source and target system, which can render an overall system according to the present techniques agnostic on target type.

After operation 1106, process flow 1100 moves to 1108, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of source server 102, target server 106A, target server 106B, and/or target server 106C of FIG. 1.

In some examples, computing environment 1200 can implement one or more embodiments of the process flows of FIGS. 3-10 to facilitate a scalable and system-agnostic replication mechanism between on-premises and cloud storage systems.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors: single-processors with software multithread execution capability: multi-core processors: multi-core processors with software multithread execution capability: multi-core processors with hardware multithread technology: parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components." or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A: X employs B: or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory coupled to the at least one processor, comprising instructions that cause the at least one processor to perform operations comprising:
registering, by a replication component and with a notification component, for notifications to changes in a group of data objects in data object storage, wherein the notification component is configured to write respective changes in the group of data objects to a replication stream;
performing an initial replication of the group of data objects, comprising,
listing respective data of the group of data objects independently of whether respective changes have occurred for the respective data objects,
creating respective creation events for the respective data objects based on performing the initial replication,
independently of when the respective data objects were created, and
independently of whether the respective changes have occurred for the respective data objects, wherein the respective creation events indicate that the respective data objects have been created, and sending the respective creation events for the data objects to the replication stream;

retrieving, by the replication component, a change of the changes in the group of data objects from the replication stream; and in response to determining that the change corresponds to a replication policy, replicating, by the replication component, data of the group of data objects that corresponds to the change to a target system, wherein the replication component is configured to perform a replication on target systems having respective different storage types.

2. The system of claim 1, wherein the operations further comprise:

performing the determining to perform the initial replication in response to determining that the replication policy has been added to the data.

3. The system of claim 1, wherein respective different storage types, of the different storage types of the target systems with which the replication component is configured to perform replications, comprise an object storage type, a file storage type, a blob storage type, an on-premises storage type, or a public cloud storage type.

4. The system of claim 1, wherein the change is a first change, wherein the replication is a first replication, and wherein the operations further comprise:

retrieving, by the replication component, a second change of the changes in the group of data object from the replication stream; and in response to determining that the second change does not correspond to any of a group of replication policies that comprises the replication policy, determining not to perform a second replication that corresponds to the second change.

5. The system of claim 1, wherein the replicating of the data comprises:

determining a change type of the change, wherein the change type comprises a copy operation, an update operation, or a delete operation; and replicating the data based on the change type.

6. The system of claim 1, wherein the operations further comprise:

storing, by the replication component, a result of the replicating of the data in a data store.

7. The system of claim 6, wherein the data store is stored separately from a source system that stores the data.

8. The system of claim 6, wherein the storing of the result comprises storing a last modified time of the data in the data store.

9. The system of claim 1, wherein the operations further comprise:

in response to determining that an error has occurred that caused event order misplacement, comparing a first last modified time in the change with a second last modified time for the group of data objects in the data object storage to produce a result; and in response to determining that the result indicates that the first last modified time is more recent than the second last modified time, determining to perform the replicating of the data of the group of data objects that corresponds to the change to the target system.

10. A method, comprising:

performing an initial replication of a group of data, comprising, listing, by a system comprising a processor, respective data of the group of data independently of whether respective changes have occurred for the respective data, creating respective creation events for the respective data based on performing the initial replication, independently of when the respective data were created, and independently of whether the respective changes have occurred for the respective data, wherein the respective creation events indicate that the respective data have been created, and sending the respective creation events for the data to a replication queue;

retrieving, by the system, a change in data of the group of data that are stored in storage from the replication queue;

in response to determining that the change corresponds to a replication policy, replicating, by the system, the data that corresponds to the change to a target system; and performing, by the system, a replication on target systems having respective different storage types.

11. The method of claim 10, wherein the change indicates a creation, a deletion, or a metadata update.

12. The method of claim 10, further comprising:

in response to determining that an error has occurred that caused event order misplacement, comparing, by the system, a first last modified time in the change with a second last modified time for the data that is stored in a data store to produce a result; and in response to determining that the result indicates that the first last modified time is more recent than the second last modified time, determining, by the system, to perform the replicating.

13. The method of claim 10, wherein the data is a first data, wherein the change is a first change, and further comprising:

in response to determining that an error has occurred that caused event order misplacement, comparing, by the system, a first last modified time in a second change that corresponds to a second data with a second last modified time for the second data that is stored in a data store to produce a result; and in response to determining that the result indicates that the second last modified time is more recent than the first last modified time, determining not to perform a second replication based on the second change.

14. The method of claim 10, further comprising:

determining, by the system, a batch processing schedule for replications; and performing, by the system, the replications according to the batch processing schedule.

15. The method of claim 14, wherein the replicating is performed by a replication handler, and further comprising:

detaching, by the system, the replication handler from the replication queue in response to determining that the batch processing schedule indicates that replications are not to be performed at a current time; and attaching, by the system, the replication handler to the replication queue in response to determining that the batch processing schedule indicates that replications are to be performed at the current time.

16. A non-transitory computer-readable medium comprising instructions that, in response to execution, cause a system comprising a processor and communicatively coupled to a device discovery service and a device onboarding service, to perform operations, comprising:

performing an initial replication of a group of data, comprising,
  listing, by a system comprising a processor, respective data of the group of data independently of whether respective changes have occurred for the respective data,
  creating respective creation events for the respective data based on performing the initial replication, wherein the respective creation events indicate that the respective data have been created, and
  sending the respective creation events for the data to a replication queue;
retrieving an event notification for data of the group of data from the replication queue, wherein the group of data are stored in storage; and
in response to determining that the event notification corresponds to a replication policy, replicating the data to a target system.

17. The non-transitory computer-readable medium of claim 16, wherein the operations further comprise performing a replication on target systems having respective different storage types.

18. The non-transitory computer-readable medium of claim 16, wherein the replicating of the data is performed by a replication handler that performs streaming processing.

19. The non-transitory computer-readable medium of claim 16, wherein the operations comprise:
  before the replicating,
    listing data in a bucket independently of whether respective events have occurred for respective data of the group of data, and
    sending respective creation events for the data to the replication queue.

20. The non-transitory computer-readable medium of claim 16, wherein the system is a message queue consumer of the replication queue.

* * * * *